(12) United States Patent
Xu et al.

(10) Patent No.: US 12,511,609 B2
(45) Date of Patent: Dec. 30, 2025

(54) METHOD AND DEVICE FOR EVALUATING SHIPPING RISK CAUSED BY SEA ICE DISASTER, AND COMPUTING DEVICE

(71) Applicant: BEIJING NORMAL UNIVERSITY AT ZHUHAI, Zhuhai (CN)

(72) Inventors: Yingjun Xu, Zhuhai (CN); Yu Yan, Zhuhai (CN); Jizhe Gao, Zhuhai (CN); Hua Zhang, Zhuhai (CN); Wei Gu, Zhuhai (CN)

(73) Assignee: BEIJING NORMAL UNIVERSITY AT ZHUHAI, Zhuhai (CN)

( * ) Notice: Subject to any disclaimer, the term of this patent is extended or adjusted under 35 U.S.C. 154(b) by 0 days.

(21) Appl. No.: 18/772,516

(22) Filed: Jul. 15, 2024

(65) Prior Publication Data

US 2024/0370817 A1    Nov. 7, 2024

Related U.S. Application Data

(63) Continuation of application No. PCT/CN2024/082436, filed on Mar. 19, 2024.

(30) Foreign Application Priority Data

May 4, 2023    (CN) .......................... 202310490499.8

(51) Int. Cl.
*G06Q 10/083* (2024.01)
*G06Q 10/0635* (2023.01)
*G06Q 10/0835* (2023.01)

(52) U.S. Cl.
CPC ... *G06Q 10/08355* (2013.01); *G06Q 10/0635* (2013.01); *G06Q 10/0838* (2013.01)

(58) Field of Classification Search
None
See application file for complete search history.

(56) References Cited

U.S. PATENT DOCUMENTS 8,652,041 B2    2/2014   Moore-ede
8,860,564 B2    10/2014  Rubin et al.
(Continued)

FOREIGN PATENT DOCUMENTS

CN    116562621 A    8/2023

OTHER PUBLICATIONS

Fu, Shanshan, et al. "Towards a probabilistic model for predicting ship besetting in ice in Arctic waters." Reliability Engineering & System Safety 155 (2016): 124-136. (Year: 2016).*

(Continued)

*Primary Examiner* — George Chen
(74) *Attorney, Agent, or Firm* — Li & Cai Intellectual Property Office (57) ABSTRACT

The present disclosure provides a method and a device for evaluating a shipping risk caused by a sea ice disaster, and a computing device. The method includes: obtaining a historical daily-scale sea ice thickness data set of a monitored region; evaluating a risk level of sea ice disaster-inducing factors, vulnerability of a disaster-affected body and an exposure level in accordance with the historical daily-scale sea ice thickness data set; determining a disaster-bearing capability and a risk level of the disaster-affected body in the sea ice disaster in accordance with the risk level of the sea ice disaster-inducing factors, the vulnerability of the disaster-affected body and the exposure level; and evaluating shipping risks for different types of disaster-affected bodies within different return periods in accordance with the disaster-bearing capability and the risk level of the disaster-affected body in the sea ice disaster.

7 Claims, 2 Drawing Sheets

(56) References Cited

U.S. PATENT DOCUMENTS 8,924,311 B2 12/2014 Szydlowski et al.
2021/0097369 A1* 4/2021 Tocornal ................ G06V 10/82

OTHER PUBLICATIONS

A risk-based approach for determining the future potential of commercial shipping in the Arctic. Journal of Marine Engineering & Technology 21.2 (2022): 82-99 (Year: 2022).*
Internation Search Report of PCT/CN2024/082436, Mailed Jun. 24, 2024.
Zhuang Li et al., Journal of Transport Information and Safety, A Risk Assessment Method of Ship Navigation in the Arctic Waters under Influences of Sea Ice, 2020, pp. 92-98, vol. 38, Issue 3, China.

* cited by examiner

METHOD AND DEVICE FOR EVALUATING SHIPPING RISK CAUSED BY SEA ICE DISASTER, AND COMPUTING DEVICE

CROSS-REFERENCE TO RELATED APPLICATIONS

This application is a continuation of International Patent Application No. PCT/CN2024/082436 filed on Mar. 19, 2024, designating the United States, now pending, and further claims priority to Chinese patent application No. 202310490499.8 filed on May 4, 2023. The content of the aforementioned applications, including any intervening amendments thereto, is incorporated herein by reference in its entirety.

TECHNICAL FIELD

The present disclosure relates to the field of intelligent identification of a remote sensing image, in particular to a method and a device for evaluating a shipping risk caused by a sea ice disaster, and a computing device.

BACKGROUND

Generally, sea ice is an umbrella term of all ice appearing at sea, including ice formed by salty water from sea and ice formed by fresh water from land. Sea ice disaster refers to blockage of shipping lanes, damages to vessels, and damages to offshore and coastal facilities caused by sea ice. Sea ice may adversely affect ocean transportation, aquaculture, oil and gas exploitation, offshore facilities and other maritime activities at Bohai Sea, and tremendous economic losses are caused in each year of a severe ice condition. According to the first National Survey on Natural Disaster Risks, the sea ice disaster is one of the principal ocean disasters and adversely affects the ocean environmental security and economic development in China. The shipping industry in Bohai area promotes the economic development in Northern China, and affects the economic development in Southern China through coal transportation. Hence, there is an urgent need to evaluate a shipping risk caused by the sea ice disaster at Bohai Sea, so as to plan the navigation in winter at Bohai Sea, thereby to ensure the transportation security.

An Automatic Identification System (AIS) is a novel assistive technology applied between a vessel and coast as well as between vessels. AIS data is constituted by trajectories of vessels, and it includes such information as latitude, longitude and time, so it may be used to monitor features of vessels in a certain region, such as positions of vessels, a density of vessels, a speed of each vessel and a vessel traffic volume.

Currently, the risk caused by the sea ice disaster at Bohai Sea is evaluated mainly in accordance with disaster-inducing factors such as an annual freezing duration, a maximum sea ice thickness and a density of the sea ice in combination with disaster-affected factors such as port handling capacity, a density of oil and gas platforms, an aquiculture area and ocean project investment at and around Bohai Sea. However, due to the lack of ice condition data with a high temporal-spatial resolution and data about typical disaster-affected bodies at Bohai Sea, it is impossible to provide, through this semi-quantitative evaluation method, a theoretical reference and a technical support to the navigation security in winter.

SUMMARY

An object of the present disclosure is to provide a method and a device for evaluating a shipping risk caused by a sea ice disaster, and a computing device, so as to provide a reference for different types of vessels at different seas in winter, and help the vessels to avoid the risk.

In order to solve the above-mentioned technical problem, the present disclosure provides the following technical solutions.

In one aspect, the present disclosure provides in some embodiments a method for evaluating a shipping risk caused by a sea ice disaster, including: obtaining a historical daily-scale sea ice thickness data set in a monitored region; evaluating a risk level of sea ice disaster-inducing factors, vulnerability of a disaster-affected body and an exposure level in accordance with the historical daily-scale sea ice thickness data set; determining a disaster-bearing capability and a risk level of the disaster-affected body in the sea ice disaster in accordance with the risk level of the sea ice disaster-inducing factors, the vulnerability of the disaster-affected body and the exposure level; and evaluating shipping risks for different types of disaster-affected bodies within different return periods in accordance with the disaster-bearing capability and the risk level of the disaster-affected body in the sea ice disaster.

In a possible embodiment of the present disclosure, the obtaining the historical daily-scale sea ice thickness data set in the monitored region includes: obtaining historical sea ice thickness data in the monitored region; and generating a discontinuous daily-scale sea ice thickness data set in accordance with the historical sea ice thickness data.

In a possible embodiment of the present disclosure, the evaluating the risk level of the sea ice disaster-inducing factors in accordance with the historical daily-scale sea ice thickness data set includes: sampling an annual maximum sequence for each 1-km$^2$ grid in the monitored region, so as to obtain an annual maximum sequence for a daily-scale sea ice thickness data set; fitting the annual maximum sequence through at least one maximum distribution model, and calculating a distribution parameter of each grid through a maximum likelihood estimation model; verifying goodness of distribution fitting for each grid in accordance with the distribution parameter of each grid, so as to determine optimal fitting distribution for each grid; and evaluating the risk level of the sea ice disaster-inducing factors using exceeding probability and the return period in accordance with the optimal fitting distribution for each grid, so as to obtain the risk level of the sea ice disaster-inducing factors.

In a possible embodiment of the present disclosure, the exceeding probability is calculated through $EP=1-F(X)=1-P(X<x)=1-\int_{-\infty}^{x}f(x)dx$, and the return period is calculated through $$RP = \frac{M_t}{EP} = \frac{M_t}{1-F(X)},$$

where EP represents the exceeding probability, RP represents return period, F(X) represents cumulative probability, $M_t$ represents a mean time of two disasters, X represents a random variable of a continuous type, and x represents any real number.

In a possible embodiment of the present disclosure, the evaluating the vulnerability of the disaster-affected body and the exposure level in accordance with the historical daily-scale sea ice thickness data set includes: calculating passing-through expectation values of the disaster-affected bodies within a nonfreezing period and a freezing period for each 1-km$^2$ grid at Bohai Sea in accordance with the historical daily-scale sea ice thickness data set, so as to obtain loss rates of the disaster-affected bodies at different sea ice thicknesses; evaluating the vulnerability of the disaster-affected body in accordance with the loss rates of the disaster-affected bodies at different sea ice thicknesses; calculating a loss rate of the disaster-affected body at a grid scale in accordance with the passing-through expectation values of the disaster-affected bodies within the nonfreezing period and the freezing period for each 1-km$^2$ grid, and creating a curve of the vulnerability of the disaster-affected body in accordance with the loss rate of the disaster-affected body and a maximum sea ice thickness within the freezing period for the grid; and obtaining historical data about the disaster-affected bodies in the monitored region, and calculating the total passing-through quantity of the disaster-affected bodies for each 1-km$^2$ grid in the monitored region in winter, so as to obtain the exposure levels of the disaster-affected bodies in different sub-regions of the monitored region.

In a possible embodiment of the present disclosure, the passing-through expectation value of the disaster-affected bodies is calculated through $F_i = P \times N$ (i=1, 2, 3 ... n), where $$P = \frac{d_{x0}}{d_x},$$

$F_i$ represents the passing-through expectation value of the disaster-affected bodies for an $i^{th}$ grid in the monitored region, n represents the total quantity of grids in the monitored region, P represents a passing-through probability of the disaster-affected bodies, N represents the total passing-through quantity of disaster-affected bodies, $d_x$ represents the total quantity of days for the freezing period or non-freezing period in the monitored region in winter within one year, and $d_{x0}$ represents the quantity of days for the freezing period or nonfreezing period when the disaster-affected bodies pass through the monitored region. The loss rate of the disaster-affected body is calculated through $$LR = \frac{F_0 - F_x}{F_0} \times 100\%,$$

where LR represents the loss rate of the disaster-affected bodies, $F_0$ represents the passing-through expectation value at a grid scale within the nonfreezing period, and $F_x$ represents the passing-through expectation value at a grid scale within the freezing period.

In a possible embodiment of the present disclosure, the evaluating the shipping risks for different types of disaster-affected bodies within different return periods in accordance with the disaster-bearing capability and the risk level of the disaster-affected body in the sea ice disaster includes calculating, through a predetermined sea ice disaster risk evaluation model, sea ice thickness data, vulnerability curves of the disaster-affected bodies and exposure level data about the disaster-affected bodies for each 1-km$^2$ grid within different return periods in the monitoring region, so as to evaluate the shipping risks caused by the sea ice disaster in the monitored region. The shipping risk caused by the sea ice disaster in the monitored region is calculated through $R_n = H_n \times V_n \times E_n$ (n=1, 2, 3 ...), where R represents the shipping risk caused by the sea ice disaster in the monitored region, H represents the risk level of the disaster-inducing factor, V represents the vulnerability of the disaster-affected body, E represents the exposure level of the disaster-affected body, and n represents a serial number of the grid in the monitored region. When a value of the disaster-affected body is E and an equation of the vulnerability curve is V(x), a once-in-t-years loss is calculated through $R_{ni}(t) = V_i[H_n(t)] \times E_{ni}$ (i=1, 2, 3, 4), where i represents serial numbers of four types of vessels.

In another aspect, the present disclosure provides in some embodiments a device for evaluating a shipping risk caused by a sea ice disaster, including: an obtaining module configured to obtain a historical daily-scale sea ice thickness data set in a monitored region; and a processing module configured to evaluate a risk level of sea ice disaster-inducing factors, vulnerability of a disaster-affected body and an exposure level in accordance with the historical daily-scale sea ice thickness data set, determine a disaster-bearing capability and a risk level of the disaster-affected body in the sea ice disaster in accordance with the risk level of the sea ice disaster-inducing factors, the vulnerability of the disaster-affected body and the exposure level, and evaluate shipping risks for different types of disaster-affected bodies within different return periods in accordance with the disaster-bearing capability and the risk level of the disaster-affected body in the sea ice disaster.

In yet another aspect, the present disclosure provides in some embodiments a computing device, including: one or more processors; and a memory configured to store therein one or more programs. The one or more programs is executed by the one or more processors, so as to implement the above-mentioned method.

In still yet another aspect, the present disclosure provides in some embodiments a computer-readable storage medium storing therein a program. The program is executed by a processor so as to implement the above-mentioned method.

The present disclosure at least has the following beneficial effects.

According to the embodiments of the present disclosure, the risk level of the sea ice disaster-inducing factors, the vulnerability of the disaster-affected body and the exposure level are evaluated in accordance with the historical daily-scale sea ice thickness data set, the disaster-bearing capability and the risk level of the disaster-affected body in the sea ice disaster are determined in accordance with the risk level of the sea ice disaster-inducing factors, the vulnerability of the disaster-affected body and the exposure level, and the shipping risks for different types of disaster-affected bodies within different return periods are evaluated in accordance with the disaster-bearing capability and the risk level of the disaster-affected body in the sea ice disaster. As a result, it is able to provide a reference for different types of vessels at different seas in winter, and help the vessels to avoid the risk.

DETAILED DESCRIPTION OF PREFERRED EMBODIMENTS

The present disclosure will be described hereinafter in conjunction with the drawings and embodiments. The following embodiments are for illustrative purposes only, but shall not be used to limit the scope of the present disclosure. Actually, the embodiments are provided so as to facilitate the understanding of the scope of the present disclosure.

Figure 1:
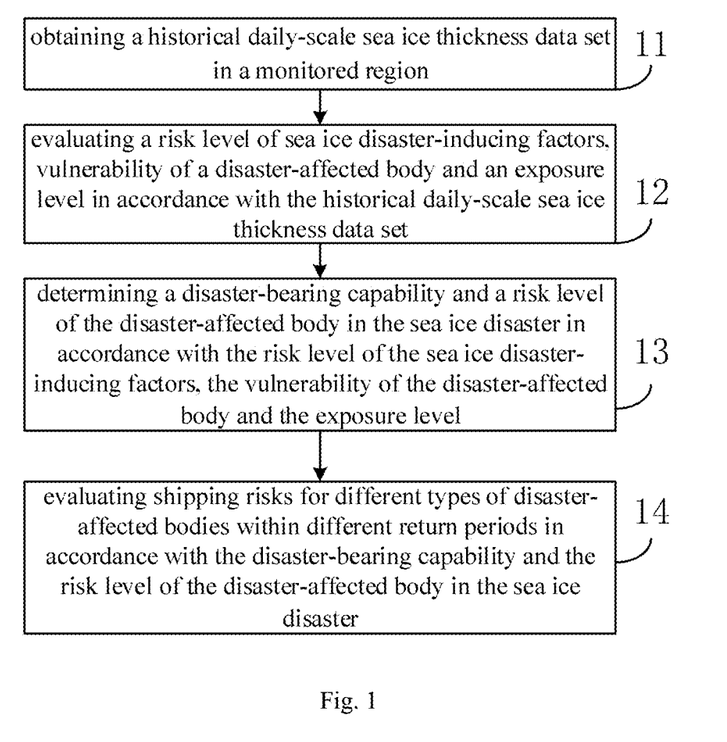
FIG. 1 is a flow chart of a method for evaluating a shipping risk caused by a sea ice disaster according to one embodiment of the present disclosure.

As shown in FIG. 1, the present disclosure provides in some embodiments a method for evaluating a shipping risk caused by a sea ice disaster, which includes: Step 11 of obtaining a historical daily-scale sea ice thickness data set in a monitored region; Step 12 of evaluating a risk level of sea ice disaster-inducing factors, vulnerability of a disaster-affected body and an exposure level in accordance with the historical daily-scale sea ice thickness data set; Step 13 of determining a disaster-bearing capability and a risk level of the disaster-affected body in the sea ice disaster in accordance with the risk level of the sea ice disaster-inducing factors, the vulnerability of the disaster-affected body and the exposure level; and Step 14 of evaluating shipping risks for different types of disaster-affected bodies within different return periods in accordance with the disaster-bearing capability and the risk level of the disaster-affected body in the sea ice disaster.

In the embodiments of the present disclosure, in Step 11, the historical daily-scale sea ice thickness data set in the monitored region is collected through satellites or sensors. Through the collected data set, it is able to provide information about sea ice varying along with time as well as summarization of sea ice characters in the monitored region, thereby to provide a data basis for the subsequent evaluation. In Step 12, the sea ice disaster-inducing factors are evaluated in accordance with the historical daily-scale sea ice thickness data set, including but not limited to such parameters as sea ice coverage, sea ice thicknesses and sea ice forms. Through evaluating the risk levels of these parameters, it is able to facilitate the prediction of the probability and a severity level of the sea ice disaster. Through Step 12, it is able to determine the sea ice disaster-inducing factors, thereby to provide a reference for the subsequent evaluation. In Step 13, the vulnerability of the disaster-affected body and the exposure level are evaluated in accordance with the risk level of the sea ice disaster-inducing factors, and the disaster-affected body may be a vessel, a wharf or an offshore facility. Through evaluating the vulnerability and exposure level of the disaster-affected bodies, it is able to determine a challenge and a risk in front of the disaster-affected bodies. Through Step 13, it is able to determine the vulnerability and exposure level of the disaster-affected bodies, thereby to provide a reference for the subsequent evaluation. In Step 14, the disaster-bearing capability and the risk level of the disaster-affected body in the sea ice disaster are determined in accordance with the risk level of the sea ice disaster-inducing factors, the vulnerability of the disaster-affected body and the exposure level. When the vulnerability and the exposure level are high, the disaster-bearing capability of the disaster-affected body may be adversely affected, and the risk level may increase. Through Step 14, it is able to determine the disaster-bearing capability and the risk level of the disaster-affected body in the sea ice disaster, thereby to provide a reference for the subsequent evaluation. In Step 15, the shipping risks for different types of disaster-affected bodies within different return periods are determined in accordance with the disaster-bearing capability and the risk level of the disaster-affected body in the sea ice disaster determined in Step 14. Through Step 15, it is able to determine the shipping risks for different types of disaster-affected bodies in front of different levels of sea ice disasters, thereby to provide a scientific basis for the prediction and prevention of any marine traffic accidents.

In a possible embodiment of the present disclosure, Step 11 includes: Step 111 of obtaining historical sea ice thickness data in the monitored region; and Step 112 of generating a discontinuous daily-scale sea ice thickness data set in accordance with the historical sea ice thickness data.

In the embodiments of the present disclosure, the monitored region is a region at Bohai Sea, and the historical daily-scale sea ice thickness data set in the monitored region is a discontinuous daily-scale Bohai Sea thickness data set formed in accordance with sea ice thicknesses for each 1-km$^2$ grid from 1987 to 2018 extracted from multi-source remote sensing images.

In a possible embodiment of the present disclosure, Step 12 includes: Step 121 of sampling an annual maximum sequence for each 1-km$^2$ grid in the monitored region, so as to obtain an annual maximum sequence for a daily-scale sea ice thickness data set; Step 122 of fitting the annual maximum sequence through at least one maximum distribution model, and calculating a distribution parameter of each grid through a maximum likelihood estimation model; Step 123 of verifying goodness of distribution fitting for each grid in accordance with the distribution parameter of each grid, so as to determine optimal fitting distribution for each grid; and Step 124 of evaluating the risk level of the sea ice disaster-inducing factors using exceeding probability and the return period in accordance with the optimal fitting distribution for each grid, so as to obtain the risk level of the sea ice disaster-inducing factors.

In the embodiments of the present disclosure, with respect to each 1-km$^2$ grid at Bohai Sea, the annual maximum sequences of the sea ice thicknesses from 1987/1988 to 2018/2019 are obtained through Annual Maximum (AM) sampling, and each sequence includes 32 maximum values. Next, the annual maximum sequences are fitted through nine common maximum distribution models, and the distribution parameters of each grid are calculated through maximum likelihood estimation. Then, the goodness of distribution fitting for each grid is verified through Kolmogorov-Smirnov (KS) test at a significance level of 0.05, so as to determine the optimal fitting distribution for each grid. In the evaluation of the disaster risk, a major research object is the possibility of exceeding a certain limit, and this possibility is called as Exceeding Probability (EP). The Return Period (RP) is a specific form of the EP. A once-in-century disaster refers to a disaster with an occurrence probability of 1% on a yearly basis.

It should be appreciated that, in Step 121, the daily-scale sea ice thickness data is randomly extracted from each 1-km$^2$ grid in the monitored region, and the annual maximum sequence for each grid is calculated in accordance with the daily-scale sea ice thickness data, so as to obtain the desired sea ice data for the subsequent data processing and analysis. In Step 122, the annual maximum sequence for each grid obtained in Step 121 is fitted through at least one maximum distribution model, and the distribution parameters of the grid, e.g., a position and a shape of a distribution function, are calculated through the maximum likelihood estimation model. Through this step, it is able to fit the data and calculate the parameters for the subsequent analysis. In Step 123, the goodness of the fitting model is verified using a goodness test value in accordance with the distribution parameters of each grid, so as to determine the optimal fitting distribution of each grid. Through this step, it is able to select a most appropriate distribution model and ensure the accuracy of an analysis result. In Step 124, the risk level of the sea ice disaster-inducing factors is evaluated using the exceeding probability and the return period in accordance with the optimal fitting distribution for each grid determined in Step 123, and an evaluation result may serve as a basis for predicting and evaluating the sea ice disaster. The exceeding probability refers to a probability that a certain threshold will be exceeded within a certain time period, and the return period refers to a time interval of the recurrences of a certain event at a constant probability. Through this step, it is able to evaluate the risk level of the sea ice disaster, thereby to provide a data support for relevant decisions.

In a possible embodiment of the present disclosure, the exceeding probability is calculated through $EP=1-F(X)=1-P(X<x)=1-\int_{-\infty}^{x} f(x)dx$, and the return period is calculated through $$RP = \frac{M_t}{EP} = \frac{M_t}{1-F(X)},$$

where EP represents the exceeding probability, RP represents return period, F(X) represents cumulative probability, $M_t$ represents a mean time of two disasters (for example, when the sea ice disaster occurs four times for the grid in 32 years, $M_t$ is 8), X represents a random variable of a continuous type, and x represents any real number.

In the embodiments of the present disclosure, a time span of the sea ice data is 32a, so the return period is selected as 5a, 10a, 20a or 30a to calculate the sea ice thickness for each grid, thereby to evaluate the risk level of the sea ice disaster-inducing factor.

In a possible embodiment of the present disclosure, Step 13 includes: Step 131 of calculating passing-through expectation values of the disaster-affected bodies within a nonfreezing period and a freezing period for each 1-km² grid at Bohai Sea in accordance with the historical daily-scale sea ice thickness data set, so as to obtain loss rates of the disaster-affected bodies at different sea ice thicknesses; Step 132 of evaluating the vulnerability of the disaster-affected body in accordance with the loss rates of the disaster-affected bodies at different sea ice thicknesses; Step 133 of calculating a loss rate of the disaster-affected body at a grid scale in accordance with the passing-through expectation values of the disaster-affected bodies within the nonfreezing period and the freezing period for each 1-km² grid, and creating a curve of the vulnerability of the disaster-affected body in accordance with the loss rate of the disaster-affected body and a maximum sea ice thickness within the freezing period for the grid; and Step 134 of obtaining historical data about the disaster-affected bodies in the monitored region, and calculating the total passing-through quantity of disaster-affected bodies for each 1-km² grid in the monitored region in winter, so as to obtain the exposure levels of the disaster-affected bodies in different sub-regions of the monitored region.

In the embodiments of the present disclosure, the passing-through expectation values of the disaster-affected bodies within the nonfreezing period and the freezing period for each 1-km² grid at Bohai Sea are calculated in accordance with AIS data obtained in the winters of 2012 and 2013, so as to obtain the loss rates of the disaster-affected bodies at different sea ice thicknesses, thereby to quantitatively evaluate the influence of the sea ice thicknesses on the shipping, and evaluate the vulnerability of the disaster-affected body. The selection of the passing-through expectation values within the nonfreezing period and the freezing period as indices is to reduce the influence of a sailing lane of the disaster-affected body on the calculation of the loss as possible.

It should be appreciated that, in Step 131, the passing-through expectation values of the disaster-affected bodies for each 1-km² grid within the nonfreezing period and the freezing period at Bohai Sea are calculated, and then the loss rates of the disaster-affected bodies at different sea ice thicknesses are obtained in accordance with the loss rates of the disaster-affected bodies at different sea ice thicknesses. Through this step, it is able to evaluate potential losses of the disaster-affected body at different sea ice thicknesses. To be specific, in this step, the passing-through expectation values of the disaster-affected bodies for each 1-km² grid within the nonfreezing period and the freezing period are calculated in accordance with the historical daily-scale sea ice thickness data set, and then the corresponding loss rates of the disaster-affected bodies at different sea ice thicknesses are calculated.

In Step 132, the vulnerability of the disaster-affected body is evaluated in accordance with the loss rates of the disaster-affected bodies at different sea ice thicknesses. Through this step, it is able to evaluate the vulnerability of the disaster-affected body at different sea ice thicknesses. To be specific, in Step 132, the vulnerability of the disaster-affected body is calculated in accordance with the loss rates of the disaster-affected body at different sea ice thicknesses calculated through Step 131. In Step 133, the loss rate of the disaster-affected body at a grid scale is calculated in accordance with the passing-through expectation values of the disaster-affected bodies within the nonfreezing period and the freezing period for each 1-km² grid, and then the curve of the vulnerability of the disaster-affected body is created in accordance with the loss rate of the disaster-affected body and a maximum sea ice thickness within the freezing period for the grid. Through this step, it is able to obtain the curve of the vulnerability of the disaster-affected body in the monitored region at Bohai Sea in accordance with the passing-through quantity of the disaster-affected bodies within the freezing period and the nonfreezing period as well as the loss rates of the disaster-affected bodies at different sea ice thicknesses.

In Step 134, the historical data about the disaster-affected bodies in the monitored region is obtained, and then the total passing-through quantity of disaster-affected bodies for each 1-km² grid in the monitored region in winter is calculated, so as to obtain the exposure levels of the disaster-affected bodies in different sub-regions of the monitored region. Through this step, it is able to obtain the data about the exposure levels of the sea ice disaster-affected bodies for the subsequent risk evaluation and prediction. In this step, it is necessary to collect the historical data about the disaster-affected bodies in the monitored region, and calculate the total passing-through quantity of disaster-affected bodies for each grid in accordance with the data.

In a possible embodiment of the present disclosure, the passing-through expectation value of the disaster-affected bodies is calculated through $F_i=P\times N$ (i=1, 2, 3 . . . n), where $$P = \frac{d_{x0}}{d_x},$$

$F_i$ represents the passing-through expectation value of the disaster-affected bodies for an $i^{th}$ grid in the monitored region, n represents the total quantity of grids in the monitored region, P represents a passing-through probability of the disaster-affected bodies, N represents the total passing-through quantity of disaster-affected bodies, $d_x$ represents the total quantity of days for the freezing period or nonfreezing period in the monitored region in winter within one year, and $d_{x0}$ represents the quantity of days for the freezing period or nonfreezing period when the disaster-affected bodies pass through the monitored region. The loss rate of the disaster-affected body is calculated through $$LR = \frac{F_0 - F_x}{F_0} \times 100\%,$$

where LR represents the loss rate of the disaster-affected bodies, $F_0$ represents the passing-through expectation value at a grid scale within the nonfreezing period, and $F_x$ represents the passing-through expectation value at a grid scale within the freezing period.

In the embodiments of the present disclosure, information about cargo vessels, oil tanks, tugboats and the other vessels is extracted from AIS data obtained in the winter of 2018, and then the total passing-through quantity of vessels for each 1-km$^2$ grid in winter at Bohai Sea is calculated, so as to obtain the exposure levels of the disaster-affected bodies in different regions at Bohai Sea.

In a possible embodiment of the present disclosure, Step 15 includes Step 151 of calculating, through a predetermined sea ice disaster risk evaluation model, sea ice thickness data, vulnerability curves of the disaster-affected bodies and exposure level data about the disaster-affected bodies for each 1-km$^2$ grid within different return periods in the monitoring region, so as to evaluate the shipping risks caused by the sea ice disaster in the monitored region. The shipping risk caused by the sea ice disaster in the monitored region is calculated through $R_n = H_n \times V_n \times E_n$ (n=1, 2, 3 ... ), where R represents the shipping risk caused by the sea ice disaster in the monitored region, H represents the risk level of the disaster-inducing factor, V represents the vulnerability of the disaster-affected body, E represents the exposure level of the disaster-affected body, and n represents a serial number of the grid in the monitored region. When a value of the disaster-affected body is E and an equation of the vulnerability curve is V(x), a once-in-t-years loss is calculated through $R_{ni}(t) = V_i[H_n(t)] \times E_{ni}$ (i=1, 2, 3, 4), where i represents serial numbers of four types of vessels.

According to the embodiments of the present disclosure, it is able to provide a reference for different types of vessels at different seas, help the vessels in winter at Bohai Sea to avoid the risk, and ensure the normal maritime activities, e.g., ocean transportation, at the Circum-Bohai Sea region.

Figure 2:
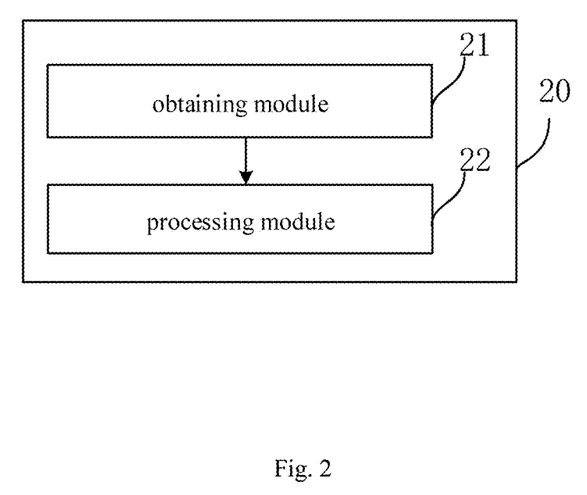
FIG. 2 is a schematic view showing a device for evaluating a shipping risk caused by a sea ice disaster according to one embodiment of the present disclosure.

As shown in FIG. 2, the present disclosure further provides in some embodiments a device 20 for evaluating a shipping risk caused by a sea ice disaster, which includes: an obtaining module 21 configured to obtain a historical daily-scale sea ice thickness data set in a monitored region; and a processing module 22 configured to evaluate a risk level of sea ice disaster-inducing factors, vulnerability of a disaster-affected body and an exposure level in accordance with the historical daily-scale sea ice thickness data set, determine a disaster-bearing capability and a risk level of the disaster-affected body in the sea ice disaster in accordance with the risk level of the sea ice disaster-inducing factors, the vulnerability of the disaster-affected body and the exposure level, and evaluate shipping risks for different types of disaster-affected bodies within different return periods in accordance with the disaster-bearing capability and the risk level of the disaster-affected body in the sea ice disaster.

In a possible embodiment of the present disclosure, the obtaining the historical daily-scale sea ice thickness data set in the monitored region includes: obtaining historical sea ice thickness data in the monitored region; and generating a discontinuous daily-scale sea ice thickness data set in accordance with the historical sea ice thickness data.

In a possible embodiment of the present disclosure, the evaluating the risk level of the sea ice disaster-inducing factors in accordance with the historical daily-scale sea ice thickness data set includes: sampling an annual maximum sequence for each 1-km$^2$ grid in the monitored region, so as to obtain an annual maximum sequence for a daily-scale sea ice thickness data set; fitting the annual maximum sequence through at least one maximum distribution model, and calculating a distribution parameter of each grid through a maximum likelihood estimation model; verifying goodness of distribution fitting for each grid in accordance with the distribution parameter of each grid, so as to determine optimal fitting distribution for each grid; and evaluating the risk level of the sea ice disaster-inducing factors using exceeding probability and the return period in accordance with the optimal fitting distribution for each grid, so as to obtain the risk level of the sea ice disaster-inducing factors.

In a possible embodiment of the present disclosure, the exceeding probability is calculated through EP=1−F(X)=1−P(X<x)=1−$\int_{-\infty}^{x} f(x)dx$, and the return period is calculated through $$RP = \frac{M_t}{EP} = \frac{M_t}{1 - F(X)},$$

where EP represents the exceeding probability, RP represents return period, F(X) represents cumulative probability, $M_t$ represents a mean time of two disasters, X represents a random variable of a continuous type, and x represents any real number.

In a possible embodiment of the present disclosure, the evaluating the vulnerability of the disaster-affected body and the exposure level in accordance with the historical daily-scale sea ice thickness data set includes: calculating passing-through expectation values of the disaster-affected bodies within a nonfreezing period and a freezing period for each 1-km$^2$ grid at Bohai Sea in accordance with the historical daily-scale sea ice thickness data set, so as to obtain loss rates of the disaster-affected bodies at different sea ice thicknesses; evaluating the vulnerability of the disaster-affected body in accordance with the loss rates of the disaster-affected bodies at different sea ice thicknesses; calculating a loss rate of the disaster-affected body at a grid scale in accordance with the passing-through expectation values of the disaster-affected bodies within the nonfreezing period and the freezing period for each 1-km$^2$ grid, and creating a curve of the vulnerability of the disaster-affected body in accordance with the loss rate of the disaster-affected body and a maximum sea ice thickness within the freezing period for the grid; and obtaining historical data about the disaster-affected bodies in the monitored region, and calculating the total passing-through quantity of disaster-affected bodies for each 1-km$^2$ grid in the monitored region in winter, so as to obtain the exposure levels of the disaster-affected bodies in different sub-regions of the monitored region.

In a possible embodiment of the present disclosure, the passing-through expectation value of the disaster-affected bodies is calculated through $F_i = P \times N$ (i=1, 2, 3 ... n), where $$P = \frac{d_{x0}}{d_x},$$

$F_i$ represents the passing-through expectation value of the disaster-affected bodies for an $i^{th}$ grid in the monitored region, n represents the total quantity of grids in the monitored region, P represents a passing-through probability of the disaster-affected bodies, N represents the total passing-through quantity of disaster-affected bodies, $d_x$ represents the total quantity of days for the freezing period or non-freezing period in the monitored region in winter within one year, and $d_{x0}$ represents the quantity of days for the freezing period or nonfreezing period when the disaster-affected bodies pass through the monitored region. The loss rate of the disaster-affected body is calculated through $$LR = \frac{F_0 - F_x}{F_0} \times 100\%,$$

where LR represents the loss rate of the disaster-affected bodies, $F_0$ represents the passing-through expectation value at a grid scale within the nonfreezing period, and $F_x$ represents the passing-through expectation value at a grid scale within the freezing period.

In a possible embodiment of the present disclosure, the evaluating the shipping risks for different types of disaster-affected bodies within different return periods in accordance with the disaster-bearing capability and the risk level of the disaster-affected body in the sea ice disaster includes calculating, through a predetermined sea ice disaster risk evaluation model, sea ice thickness data, vulnerability curves of the disaster-affected bodies and exposure level data about the disaster-affected bodies for each 1-km² grid within different return periods in the monitoring region, so as to evaluate the shipping risks caused by the sea ice disaster in the monitored region. The shipping risk caused by the sea ice disaster in the monitored region is calculated through $R_n = H_n \times V_n \times E_n$ (n=1, 2, 3 ...), where R represents the shipping risk caused by the sea ice disaster in the monitored region, H represents the risk level of the disaster-inducing factor, V represents the vulnerability of the disaster-affected body, E represents the exposure level of the disaster-affected body, and n represents a serial number of the grid in the monitored region. When a value of the disaster-affected body is E and an equation of the vulnerability curve is V(x), a once-in-t-years loss is calculated through $R_{ni}(t) = V_i[H_n(t)] \times E_{ni}$ (i=1, 2, 3, 4), where i represents serial numbers of four types of vessels.

It should be appreciated that, the device corresponds to the above-mentioned method, and the implementation of the device may refer to that of the method with a same technical effect.

The present disclosure further provides in some embodiments a computing device, including a processor, and a memory storing therein a computer program. The computer program is executed by the processor so as to implement the above-mentioned method. The implementation of the device may refer to that of the method, with a same technical effect.

The present disclosure further provides in some embodiments a computer-readable storage medium storing therein an instruction. The instruction is executed by a computer so as to implement the above-mentioned method. The implementation of the computer-readable storage medium may refer to that of the method, with a same technical effect.

It should be appreciated that, units and steps described in the embodiments of the present disclosure are implemented in the form of electronic hardware, or a combination of a computer program and the electronic hardware. Whether or not these functions are executed by hardware or software depends on specific applications or design constraints of the technical solution. Different methods are adopted with respect to the specific applications so as to achieve the described functions, without departing from the scope of the present disclosure.

It should be further appreciated that, for convenience and clarification, operation procedures of the system, device and units described hereinabove refer to the corresponding procedures in the method embodiment, and thus will not be particularly defined herein.

It should be further appreciated that, the device and method are implemented in any other ways. For example, the embodiments for the apparatus is merely for illustrative purposes, and the modules or units are provided merely on the basis of their logic functions. During the actual application, some modules or units are combined together or integrated into another system. Alternatively, some functions of the module or units are omitted or not executed. In addition, the coupling connection, direct coupling connection or communication connection between the modules or units is implemented via interfaces, and the indirect coupling connection or communication connection between the modules or units is implemented in an electrical or mechanical form or in any other form.

The units are, or are not, physically separated from each other. The units for displaying are, or are not, physical units, i.e., they are arranged at an identical position, or distributed on a plurality of network elements. Parts or all of the units are selected in accordance with the practical need, so as to achieve the purpose of the present disclosure.

In addition, the functional units in the embodiments of the present disclosure are integrated into a processing unit, or the functional units exist independently, or two or more functional units are combined together.

In the case that the functional units are implemented in a software form and sold or used as a separate product, they are stored in a computer-readable medium. Based on this, the technical solutions of the present disclosure, partial or full, or parts of the technical solutions of the present disclosure contributing to the related art, appear in the form of software products, which are stored in a storage medium and include several instructions so as to enable computer equipment (a personal computer, a server or network equipment) to execute all or parts of the steps of the method according to the embodiments of the present disclosure. The storage medium includes any medium capable of storing therein program codes, e.g., a universal serial bus (USB) flash disk, a mobile hard disk (HD), a read-only memory (ROM), a random access memory (RAM), a magnetic disk or an optical disk.

It should be further appreciated that, according to the device and the method in the embodiments of the present disclosure, the members and/or steps are subdivided and/or recombined, which shall also be deemed as equivalents of the present disclosure. In addition, the steps for executing the above-mentioned processings are performed in a chronological order. Of course, some steps are also performed in parallel, or independently of each other. It should be further appreciated that, after reading the descriptions of the present disclosure, it is able for a person skilled in the art, using a basic programming skill, to implement any or all steps of the method and any or all members of the device in any computing device (including a processor and a storage medium) or a network consisting of the computing devices, in the form of hardware, firmware, software or a combination thereof.

Hence, the purposes of the present disclosure are also implemented by one program or a set of programs running on any computing device, e.g., a known general-purpose computer, or implemented merely by a program product including programs codes capable of implementing the method or device. In other words, this program product and a storage medium storing therein the program product also constitute a part of the present disclosure. Obviously, the storage medium is any known storage medium or a storage medium that occurs in future. It should be further appreciated that, according to the device and the method in the embodiments of the present disclosure, the members and/or steps are subdivided and/or recombined, which shall also be deemed as equivalents of the present disclosure. In addition, the steps for executing the above-mentioned processings are performed in a chronological order. Of course, some steps are also performed in parallel, or independently of each other.

The above embodiments are for illustrative purposes only, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. A method for evaluating a shipping risk caused by a sea ice disaster, applied in a vessel shipping scenario, comprising:
    receiving a shipping risk request from a vessel;
    obtaining a historical daily-scale sea ice thickness data set in a monitored region;
    evaluating a risk level of sea ice disaster-inducing factors, vulnerability of a disaster-affected body and an exposure level in accordance with the historical daily-scale sea ice thickness data set;
    determining a disaster-bearing capability and a risk level of the disaster-affected body in the sea ice disaster in accordance with the risk level of the sea ice disaster-inducing factors, the vulnerability of the disaster-affected body and the exposure level;
    evaluating shipping risks for different types of disaster-affected bodies within different return periods in accordance with the disaster-bearing capability and the risk level of the disaster-affected body in the sea ice disaster; and
    returning the shipping risks to the vessel, so that the vessel based on the shipping risks corresponding to a type of the vessel;
    wherein the obtaining the historical daily-scale sea ice thickness data set in the monitored region comprises:
    obtaining historical sea ice thickness data in the monitored region; and
    generating a discontinuous daily-scale sea ice thickness data set in accordance with the historical sea ice thickness data; and
    wherein the evaluating the risk level of the sea ice disaster-inducing factors in accordance with the historical daily-scale sea ice thickness data set comprises:

sampling an annual maximum sequence for each 1-km$^2$ grid in the monitored region, so as to obtain an annual maximum sequence for a daily-scale sea ice thickness data set;
fitting the annual maximum sequence through at least one maximum distribution model, and calculating a distribution parameter of each grid through a maximum likelihood estimation model;
verifying goodness of distribution fitting for each grid in accordance with the distribution parameter of each grid, so as to determine optimal fitting distribution for each grid; and
evaluating the risk level of the sea ice disaster-inducing factors using exceeding probability and the return period in accordance with the optimal fitting distribution for each grid, so as to obtain the risk level of the sea ice disaster-inducing factors.

2. The method according to claim 1, wherein the evaluating the vulnerability of the disaster-affected body and the exposure level in accordance with the historical daily-scale sea ice thickness data set comprises:
    calculating passing-through expectation values of the disaster-affected bodies within a nonfreezing period and a freezing period for each 1-km$^2$ grid at Bohai Sea in accordance with the historical daily-scale sea ice thickness data set, so as to obtain loss rates of the disaster-affected bodies at different sea ice thicknesses;
    evaluating the vulnerability of the disaster-affected body in accordance with the loss rates of the disaster-affected bodies at different sea ice thicknesses;
    calculating a loss rate of the disaster-affected body at a grid scale in accordance with the passing-through expectation values of the disaster-affected bodies within the nonfreezing period and the freezing period for each 1-km$^2$ grid, and creating a curve of the vulnerability of the disaster-affected body in accordance with the loss rate of the disaster-affected body and a maximum sea ice thickness within the freezing period for the grid; and
    obtaining historical data about the disaster-affected bodies in the monitored region, and calculating the total passing-through quantity of disaster-affected bodies for each 1-km$^2$ grid in the monitored region in winter, so as to obtain the exposure levels of the disaster-affected bodies in different sub-regions of the monitored region.

3. The method according to claim 2, wherein the passing-through expectation value of the disaster-affected bodies is calculated through $F_i = P \times N$ (i=1, 2, 3 . . . n), where $$P = \frac{d_{x0}}{d_x},$$

$F_i$ represents the passing-through expectation value of the disaster-affected bodies for an $i^{th}$ grid in the monitored region, n represents the total quantity of grids in the monitored region, P represents a passing-through probability of the disaster-affected bodies, N represents the total passing-through quantity of disaster-affected bodies, $d_x$ represents the total quantity of days for the freezing period or nonfreezing period in the monitored region in winter within one year, and $d_{x0}$ represents the quantity of days for the freezing period or nonfreezing period when the disaster-affected bodies pass through the monitored region,
    wherein the loss rate of the disaster-affected body is calculated through $$LR = \frac{F_0 - F_x}{F_0} \times 100\%,$$

where LR represents the loss rate of the disaster-affected bodies, $F_0$ represents the passing-through expectation value at a grid scale within the nonfreezing period, and $F_x$ represents the passing-through expectation value at a grid scale within the freezing period.

4. The method according to claim 3, wherein the evaluating the shipping risks for different types of disaster-affected bodies within different return periods in accordance with the disaster-bearing capability and the risk level of the disaster-affected body in the sea ice disaster comprises calculating, through a predetermined sea ice disaster risk evaluation model, sea ice thickness data, vulnerability curves of the disaster-affected bodies and exposure level data about the disaster-affected bodies for each 1-km² grid within different return periods in the monitoring region, so as to evaluate the shipping risks caused by the sea ice disaster in the monitored region, wherein the shipping risk caused by the sea ice disaster in the monitored region is calculated through $R_n = H_n \times V_n \times E_n$ (n=1, 2, 3 ...), where R represents the shipping risk caused by the sea ice disaster in the monitored region, H represents the risk level of the disaster-inducing factor, V represents the vulnerability of the disaster-affected body, E represents the exposure level of the disaster-affected body, and n represents a serial number of the grid in the monitored region, wherein when a value of the disaster-affected body is E and an equation of the vulnerability curve is V(x), a once-in-t-years loss is calculated through $R_{ni}(t) = V_i[H_n(t)] \times E_{ni}$ (i=1, 2, 3, 4), where i represents serial numbers of four types of vessels.

5. The method according to claim 1, wherein the exceeding probability is calculated through $EP = 1 - F(X) = 1 - P(X < x) = 1 - \int_{-\infty}^{x} f(x)dx$, and the return period is calculated through $$RP = \frac{M_t}{EP} = \frac{M_t}{1 - F(X)},$$

where EP represents the exceeding probability, RP represents return period, F(X) represents cumulative probability, $M_t$ represents a mean time of two disasters, X represents a random variable of a continuous type, and x represents any real number.

6. A computing device, comprising:
one or more processors; and
a memory configured to store therein one or more programs,
wherein the one or more programs is executed by the one or more processors, so as to implement a method applied in a vessel shipping scenario, comprising:
receiving a shipping risk request from a vessel;
obtaining a historical daily-scale sea ice thickness data set in a monitored region;
evaluating a risk level of sea ice disaster-inducing factors, vulnerability of a disaster-affected body and an exposure level in accordance with the historical daily-scale sea ice thickness data set;
determining a disaster-bearing capability and a risk level of the disaster-affected body in the sea ice disaster in accordance with the risk level of the sea ice disaster-inducing factors, the vulnerability of the disaster-affected body and the exposure level;
evaluating shipping risks for different types of disaster-affected bodies within different return periods in accordance with the disaster-bearing capability and the risk level of the disaster-affected body in the sea ice disaster; and
returning the shipping risks to the vessel, so that the vessel based on the shipping risks corresponding to a type of the vessel;
wherein the obtaining the historical daily-scale sea ice thickness data set in the monitored region comprises:
obtaining historical sea ice thickness data in the monitored region; and
generating a discontinuous daily-scale sea ice thickness data set in accordance with the historical sea ice thickness data; and
wherein the evaluating the risk level of the sea ice disaster-inducing factors in accordance with the historical daily-scale sea ice thickness data set comprises:
sampling an annual maximum sequence for each 1-km² grid in the monitored region, so as to obtain an annual maximum sequence for a daily-scale sea ice thickness data set;
fitting the annual maximum sequence through at least one maximum distribution model, and calculating a distribution parameter of each grid through a maximum likelihood estimation model;
verifying goodness of distribution fitting for each grid in accordance with the distribution parameter of each grid, so as to determine optimal fitting distribution for each grid; and
evaluating the risk level of the sea ice disaster-inducing factors using exceeding probability and the return period in accordance with the optimal fitting distribution for each grid, so as to obtain the risk level of the sea ice disaster-inducing factors.

7. A non-transitory computer-readable storage medium storing therein a program, wherein the program is executed by a processor so as to implement a method applied in a vessel shipping scenario, comprising:
receiving a shipping risk request from a vessel;
obtaining a historical daily-scale sea ice thickness data set in a monitored region;
evaluating a risk level of sea ice disaster-inducing factors, vulnerability of a disaster-affected body and an exposure level in accordance with the historical daily-scale sea ice thickness data set;
determining a disaster-bearing capability and a risk level of the disaster-affected body in the sea ice disaster in accordance with the risk level of the sea ice disaster-inducing factors, the vulnerability of the disaster-affected body and the exposure level;
evaluating shipping risks for different types of disaster-affected bodies within different return periods in accordance with the disaster-bearing capability and the risk level of the disaster-affected body in the sea ice disaster; and
returning the shipping risks to the vessel, so that the vessel based on the shipping risks corresponding to a type of the vessel;
wherein the obtaining the historical daily-scale sea ice thickness data set in the monitored region comprises:
obtaining historical sea ice thickness data in the monitored region; and generating a discontinuous daily-scale sea ice thickness data set in accordance with the historical sea ice thickness data; and wherein the evaluating the risk level of the sea ice disaster-inducing factors in accordance with the historical daily-scale sea ice thickness data set comprises:

sampling an annual maximum sequence for each 1-km$^2$ grid in the monitored region, so as to obtain an annual maximum sequence for a daily-scale sea ice thickness data set;

fitting the annual maximum sequence through at least one maximum distribution model, and calculating a distribution parameter of each grid through a maximum likelihood estimation model;

verifying goodness of distribution fitting for each grid in accordance with the distribution parameter of each grid, so as to determine optimal fitting distribution for each grid; and evaluating the risk level of the sea ice disaster-inducing factors using exceeding probability and the return period in accordance with the optimal fitting distribution for each grid, so as to obtain the risk level of the sea ice disaster-inducing factors.

* * * * *